(12) United States Patent
Roberts

(10) Patent No.: US 9,167,651 B2
(45) Date of Patent: Oct. 20, 2015

(54) LED ARRAY AUXILIARY POWER SUPPLY

(75) Inventor: Bruce Richard Roberts, Mentor-on-the-Lake, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 933 days.

(21) Appl. No.: 13/164,985

(22) Filed: Jun. 21, 2011

(65) Prior Publication Data
US 2012/0326508 A1 Dec. 27, 2012

(51) Int. Cl.
H05B 39/00 (2006.01)
H05B 33/08 (2006.01)

(52) U.S. Cl.
CPC ........... *H05B 33/083* (2013.01); *Y10T 307/445* (2015.04)

(58) Field of Classification Search
CPC ...................................................... H05B 39/00
USPC ............................................. 307/36; 315/186
See application file for complete search history.

(56) References Cited

U.S. PATENT DOCUMENTS

| 8,230,690 | B1 * | 7/2012 | Salessi ............................. 62/3.7 |
| 2008/0292344 | A1 * | 11/2008 | Nagumo ........................... 399/51 |
| 2010/0141162 | A1 * | 6/2010 | Matsumoto et al. ........... 315/186 |
| 2010/0181923 | A1 | 7/2010 | Hoogzaad |
| 2011/0025216 | A1 * | 2/2011 | Ching-Chi et al. ............. 315/186 |

FOREIGN PATENT DOCUMENTS

| DE | 10358447 B3 | 5/2005 |
| WO | 2011027299 A2 | 3/2011 |
| WO | WO 2011027299 A2 * | 3/2011 |

OTHER PUBLICATIONS

Search Report and Written Opinion from corresponding International Application No. PCT/US2012/042209, dated Sep. 13, 2012.

* cited by examiner

*Primary Examiner* — Rexford Barnie
*Assistant Examiner* — Joseph Inge
(74) *Attorney, Agent, or Firm* — Pearne & Gordon LLP

(57) ABSTRACT

A method and apparatus for providing one or more operating voltages and currents to one or more auxiliary loads by tapping an LED array driven by an LED driver providing a drive voltage to the LED array, and/or supplying an operating voltage to the LED driver itself using such a tap.

16 Claims, 9 Drawing Sheets

LED ARRAY AUXILIARY POWER SUPPLY

FIELD OF THE INVENTION

This application relates generally to using an LED power supply for driving auxiliary loads, and more specifically this application relates to an apparatus and method for using the LEDs of an LED array driven by a power supply adapted for the array for regulating output voltage(s) for driving one or more auxiliary loads.

BACKGROUND OF THE INVENTION

Using LEDs for lighting applications is becoming more and more popular as the cost of LEDs drops due to manufacturing improvements. LED lighting often utilizes an array of individual LEDs, such as a plurality of LEDs connected in series, to increase the amount of light outputted to a desired amount. Such LEDs are often utilized in devices that have other components as well. However, the voltage at which an LED array operates is often much higher than the operating voltage of the other components. Adding additional circuitry in order to supply a range of voltages to operate both the LED array and the other auxiliary components adds additional weight, complexity, and cost to the devices. Desirable would be a way to avoid this additional circuitry and cost while providing the proper voltages to both the LED array and to at least some of the auxiliary components.

SUMMARY OF THE INVENTION

Provided are a plurality of embodiments of the invention, including, but not limited to, an apparatus comprising: an LED array including a plurality of LEDs connected in a series for providing illumination; a driver for providing an operating voltage to said LED array; a tap connected between two of said LEDs in said LED array for providing an auxiliary voltage less than said operating voltage; and an auxiliary component connected to said tap such that said auxiliary voltage is used to power said auxiliary component.

Also provided is an apparatus comprising: an LED array including a plurality of LEDs connected in a series for providing illumination; a driver for providing an operating voltage to said LED array; and a tap connected between two of said LEDs in said LED array for providing an auxiliary voltage less than said operating voltage, wherein said auxiliary tap is connected to said driver for providing said auxiliary voltage as an operating voltage for said driver.

Still further provided is an apparatus comprising: an LED array including a plurality of LEDs connected in a series for providing illumination; a driver for providing an operating voltage to said LED array; and a first tap connected between two of said LEDs in said LED array for providing an operating voltage to said driver; a second tap connected between another two of said LEDs for providing an auxiliary voltage; and an auxiliary component connected to said second tap such that said auxiliary voltage is used to power said auxiliary component.

Further provided is a method for providing a voltage to components by tapping an LED array, the method comprising the steps of:
 Illuminating an area using an LED array comprising a plurality of LEDs connected in series;
 driving said LED array using a voltage output from a voltage or current source; and
 tapping an auxiliary voltage from between two or more of said LEDs of said LED array for powering a load, wherein said auxiliary voltage is less than the voltage output from said voltage source.

Also provided is a lighting element of a light fixture with the lighting element comprising one of the above devices or similar devices, or utilizing the above method or similar methods.

Also provided are additional embodiments of the invention, some, but not all of which, are described hereinbelow in more detail.

BRIEF DESCRIPTION OF THE DRAWINGS

The features and advantages of the examples of the present invention described herein will become apparent to those skilled in the art to which the present invention relates upon reading the following description, with reference to the accompanying drawings, in which.

DETAILED DESCRIPTION OF THE EXAMPLE EMBODIMENTS

Groups of LEDs arranged in a manner such that a plurality of LEDS are connected in series (an "array") operate in discrete and well understood forward voltage ranges. These LEDs may include subsets of LEDs provided in parallel and then the subsets connected in series, for example. Because in some situations power supply needs of auxiliary components to be provided with the LED array can be at a lower voltage and an order of magnitude or more smaller than the current through the LEDs, the LED array can be adapted by using the LED series string as a voltage regulation circuit while having minimal effect on the operation of the LEDs themselves. For example, in a typical series array utilizing LEDs having 3V voltage drops across each LED during operation, one can provide, for example, 3 volts, 6 volts, 9 volts or 12 volts (or other multiples of 3V) directly to an auxiliary device, such as an active cooling device, such as a fan, a synthetic jet, or peltier type devices for example, with no additional electronics for providing such additional voltages, by tapping off the series LED string. In a space or efficiency constrained LED environment, having an auxiliary voltage available with no additional driver space requirement is of benefit.

Figure 1:
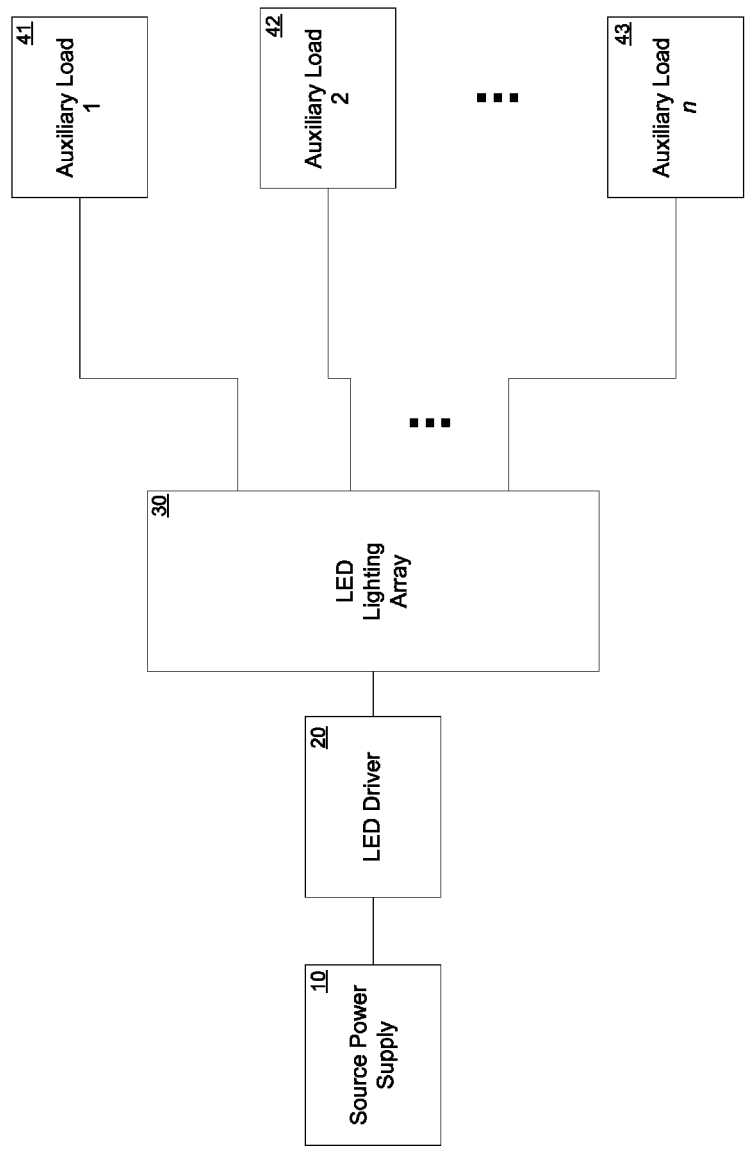
FIG. 1 shows a block diagram of one example embodiment of the device.
Figure 1A:
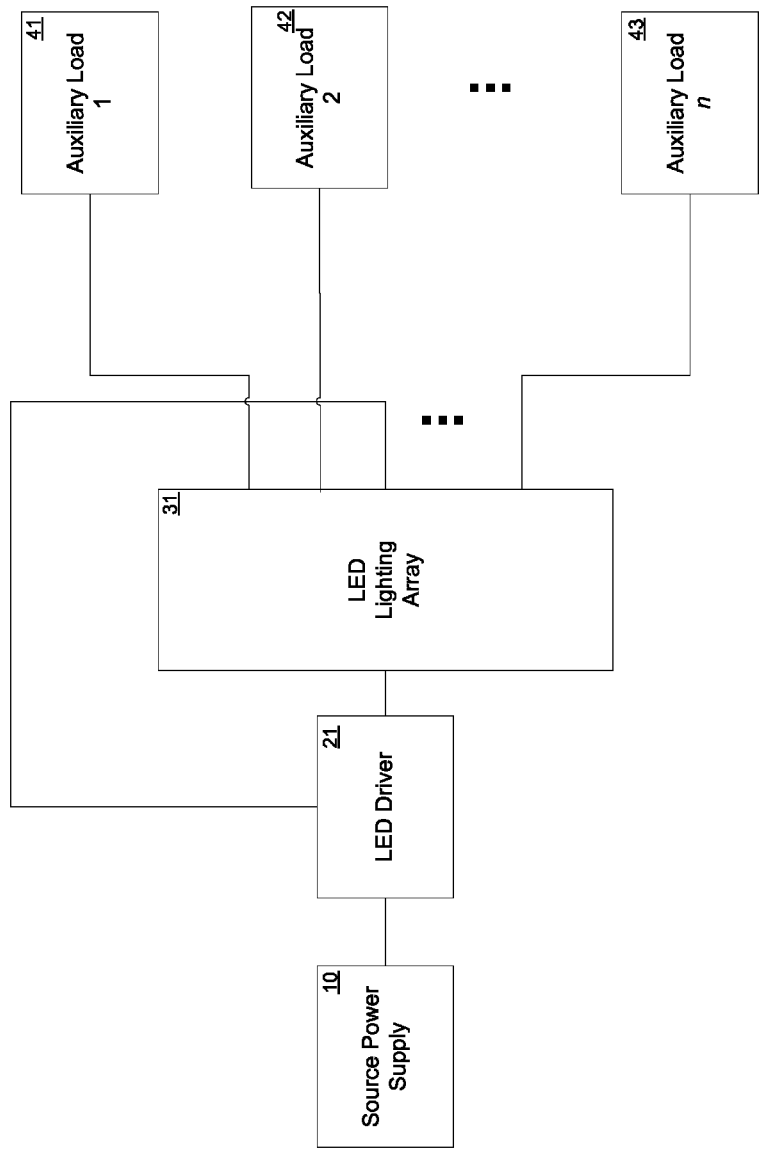
FIG. 1A shows a block diagram of another example embodiment of the device.

FIG. 1 provides a simplified block diagram showing the general concept of an example apparatus using the proposed modification. An LED lighting array 30 comprised of a series of LEDs connected in series is powered by an LED driver 20 component that is connected to a source power supply 10 (such as a 120V or 240V AC mains supply, for example). One or more taps are taken off of the LED array 30 to power one or more auxiliary loads 41, 42 . . . 43. Optionally, as shown in FIG. 1A, a tap can be used to provide DC power back to an LED Driver 21 (as a feedback path) to reduce the component requirements of the driver circuitry used to drive the array.

Figure 2:
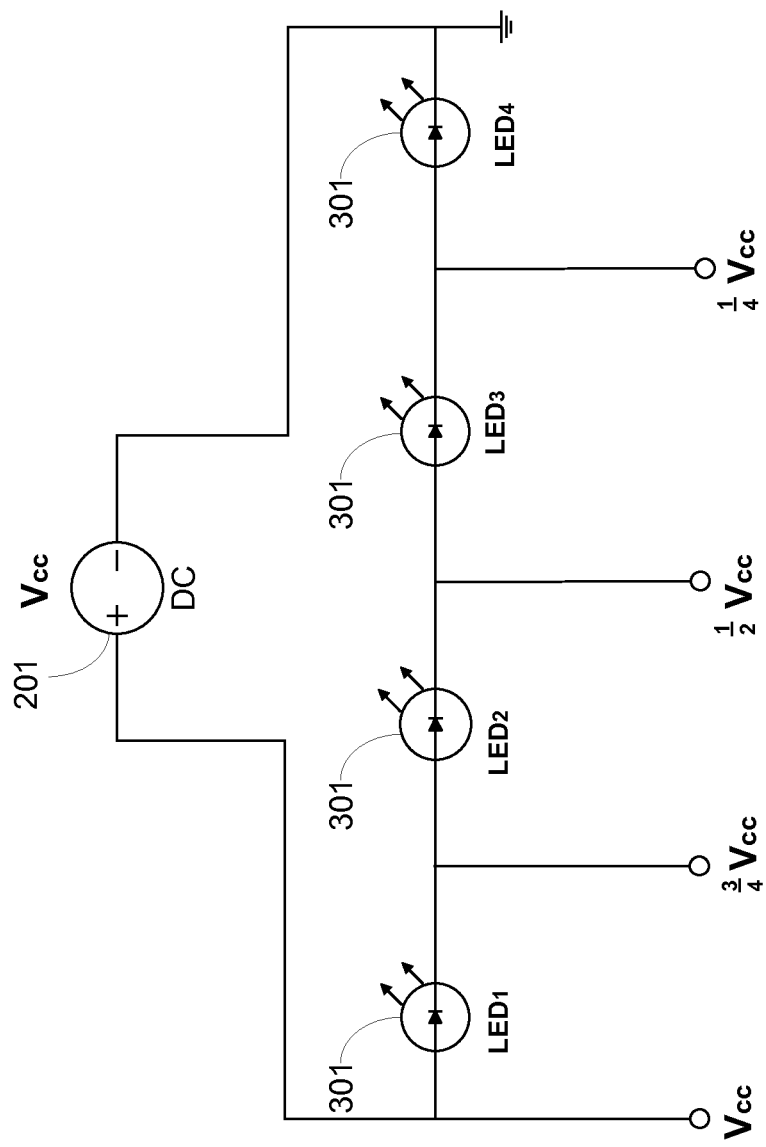
FIG. 2 shows a schematic diagram of tapping off an example LED array having uniform LEDs and regular taps.

FIG. 2 shows a schematic diagram of a simple example embodiment for tapping a simple LED array, where a DC power supply 201 (such as may be provided by an array driver circuit, for example) provides a $V_{cc}$ voltage to a four LED array using four identical LEDs 301. By adding taps between each of the LEDs 301, voltages of $V_{cc}$, three-quarters $V_{cc}$, one-half $V_{cc}$, and one-quarter Vcc can be provided, where one-quarter $V_{cc}$ is the voltage drop across one of the LEDs 301.

Of course, more or fewer LEDs could be utilized in series depending on the illumination desired, and taps need not be placed regularly between all of the LEDs, as the taps are chosen based on the voltage needs of any auxiliary components to be powered.

Figure 3:
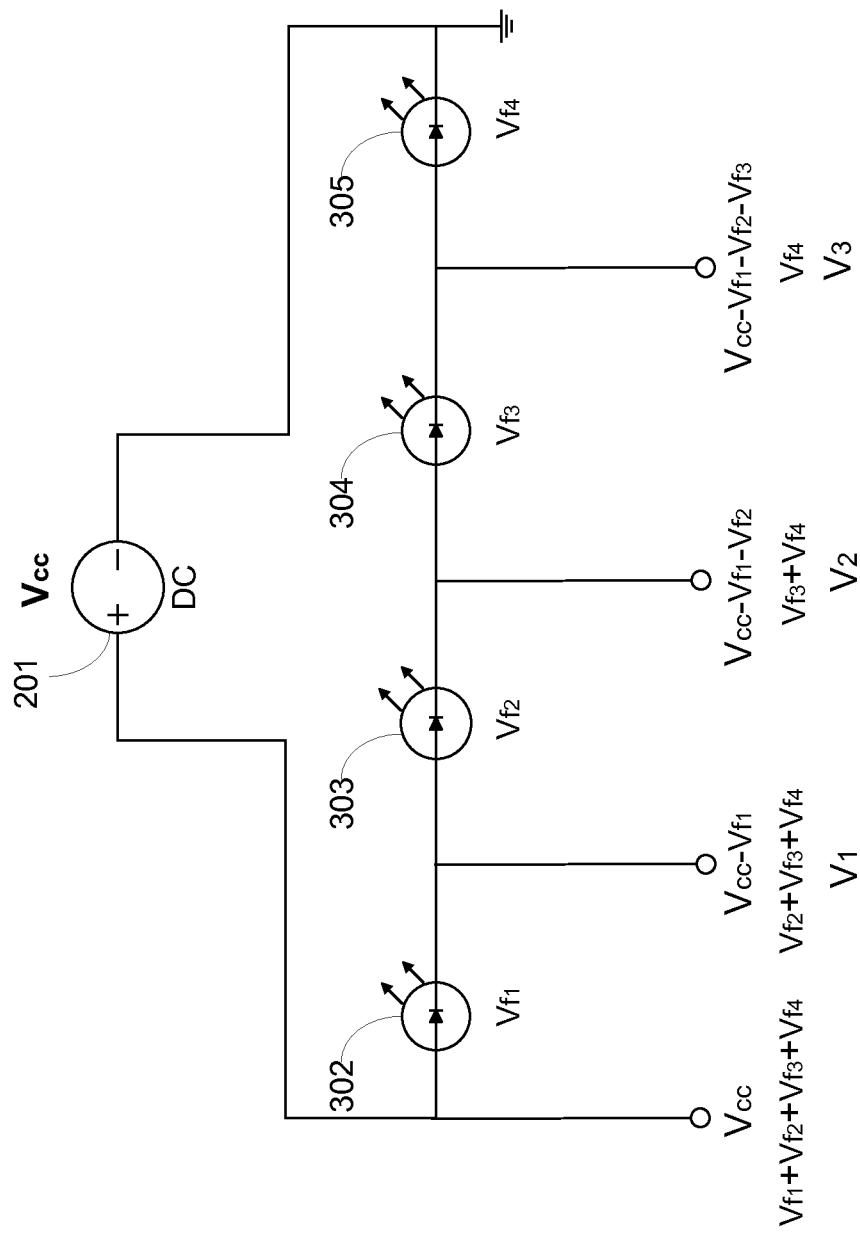
FIG. 3 shows a schematic diagram of tapping off another example LED array having non-uniform LEDS and regular taps.

FIG. 3 shows a schematic diagram of a more generic implementation of the four LED array, where each of the LEDs may be of a different composition, such as for providing a different color, for example. In such situations, each LED 302, 303, 304, and 305 may have a different voltage drop across that LED, in which case the tap voltages may not be simple fractional portions of $V_{cc}$. In this case, the voltage of the taps is based on the voltage drops across the various LEDs. Thus, besides $V_{cc}$, the provided voltages at the taps are shown by the equations Eq. 1, Eq. 2, and Eq. 3 given below:

$$V_1 = V_{cc} - V_{f1} = V_{f2} + V_{f3} + V_{f4}; \quad \text{Eq. 1}$$

$$V_2 = V_{cc} - V_{f1} - V_{f2} = V_{f3} + V_{f4}; \quad \text{Eq. 2}$$

$$V_3 = V_{cc} - V_{f1} - V_{f2} - V_{f3} = V_{f4}; \quad \text{Eq. 3}$$

Again, the number of LEDs, the locations of the taps, and the number of taps are chosen based on the desired light output, the desired voltages, and the types of loads utilizing the taps.

Figure 3A:
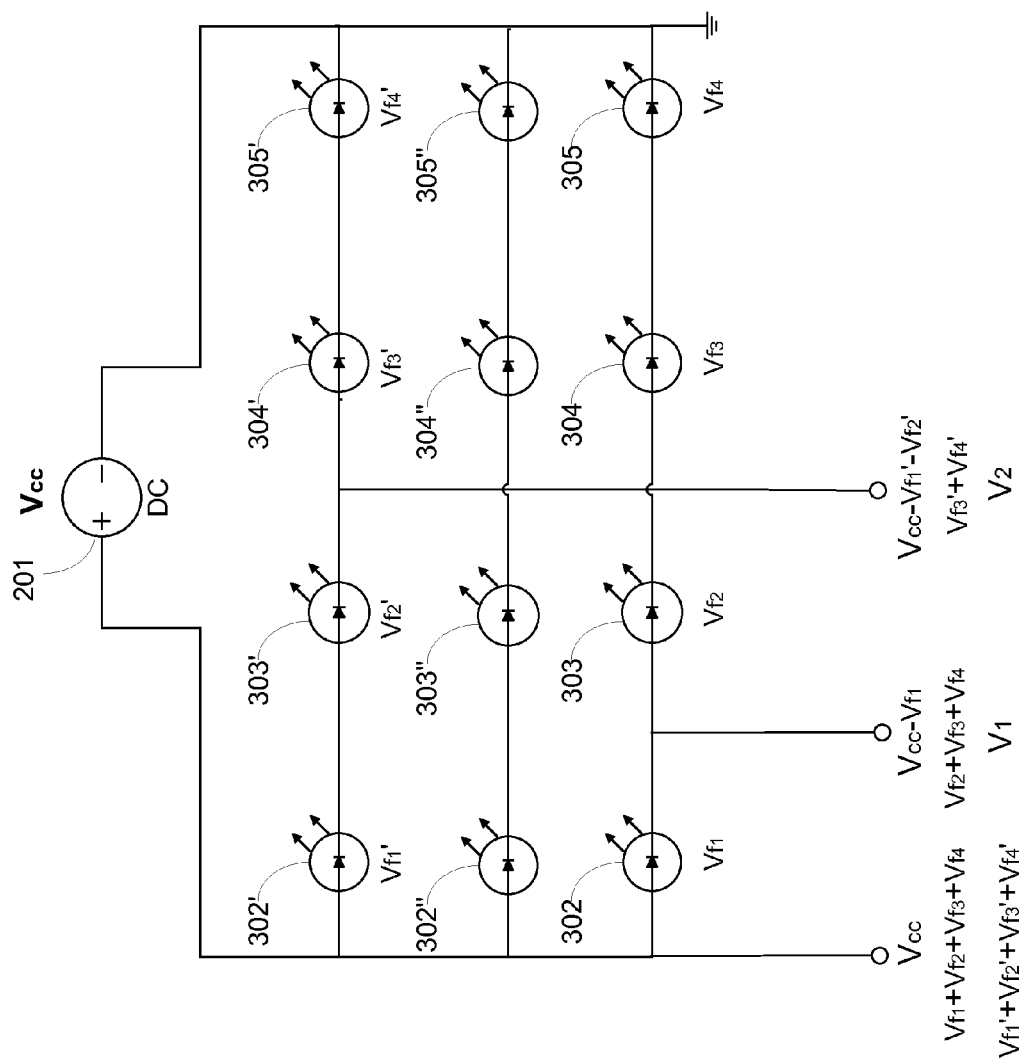
FIG. 3A shows a schematic diagram of tapping off another example LED array having non-uniform LEDS in three series subsets connected in parallel.
Figure 4:
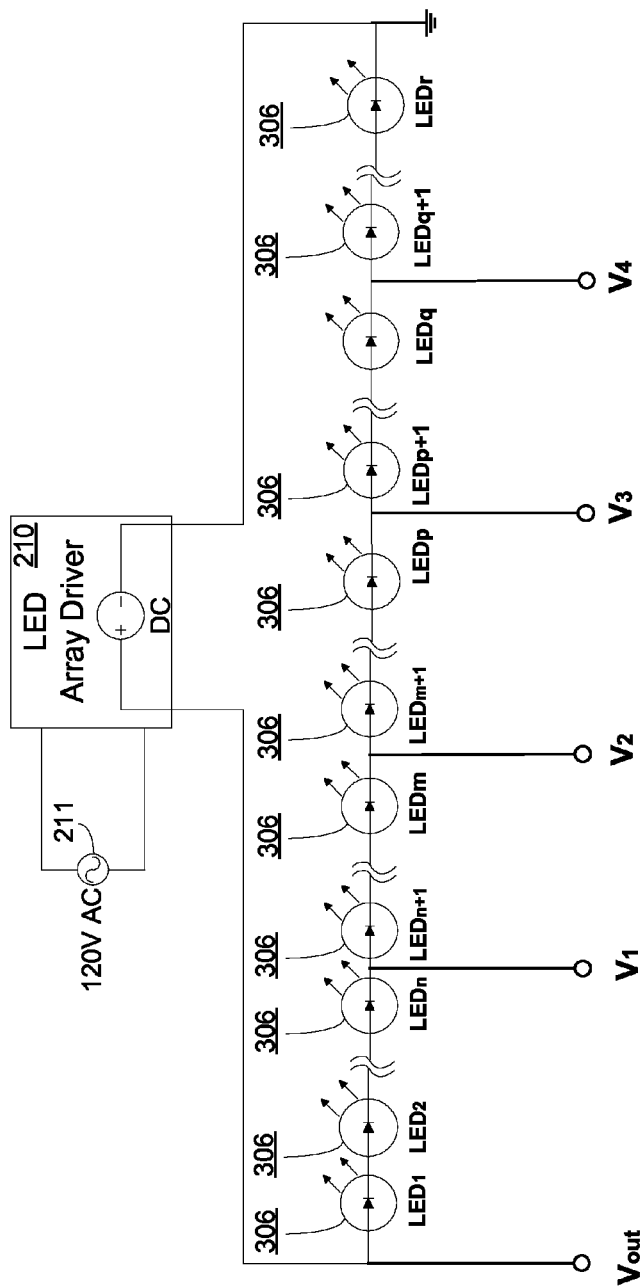
FIG. 4 shows a schematic diagram of tapping off another example LED array having uniform LEDs and taps at arbitrary locations.

FIG. 3A shows another embodiment having three subsets of series connected LEDs, a first as in FIG. 3 comprising LED 302, LED 303, LED 304, and LED 305; a second comprising LED 302', LED 303', LED 304', and LED 305', and a third comprising LED 302", LED 303", LED 304", and LED 305"; with these three subsets connected in parallel (and thus being driven with the same supply voltage $V_{cc}$). Two taps are provided, one in one series, and another in a third series, with no tap provided in a second series, with the voltages determined in a manner similar to that described above (as shown in the figure). Clearly, many different arrangements of LEDS in various series and parallel configurations could be supported with taps provided in any desirable location. IN the embodiment of FIG. 4, the load currents provided by the taps are thus borne by the different subsets of series LEDs, and thus vast flexibility to support the current and voltage needs of different loads can be supported.

FIG. 4 shows a more complicated example embodiment of the example of FIG. 2 using an arbitrary r number of identical LEDs 306 with four taps $V_1$ to $V_4$ (of course, any number of taps from 1 to one less than the number of LEDs connected in series could be utilized, as desired) An LED driver 210, powered by an AC power source 211, is used to provide controlled DC power source to provide a controlled voltage $V_{out}$ to the array of LEDs.

In this example of FIG. 4, a first tap $V_1$ is provided after a plurality n of LEDs: $LED_1$, $LED_2$, to $LED_n$. A second tap $V_2$ is provided after a plurality m-n of LEDs: $LED_{n+1}$, $LED_{n+2}$, to $LED_m$. A third tap $V_3$ is provided after a plurality p-m-n of LEDs: $LED_{m+1}$, $LED_{m+2}$, to $LED_p$. A fourth tap $V_4$ is provided after a plurality q-p-m-n of LEDs: $LED_{p+1}$, $LED_{p+2}$, to $LED_q$. Thus, besides $V_{out}$, the provided voltages at the taps are shown by the equations Eq. 4, Eq. 5, Eq. 6 and Eq. 7 given below (where r is the total number of LEDs in the series):

$$V_1 = (r-n)(V_{out})/r \quad \text{Eq. 4}$$

$$V_2 = (r-m)(V_{out})/r \quad \text{Eq. 5}$$

$$V_3 = (r-p)(V_{out})/r \quad \text{Eq. 6}$$

$$V_4 = (r-q)(V_{out})/r \quad \text{Eq. 7}$$

Thus, the output voltages are whole number fractions of the input voltage because the voltage drop across each of the LEDs 306 is identical because identical LEDs are used in this example. The numbers of LEDs that are provided between the taps can range from 1 to any number, and are chosen based on the lighting requirements of the LED array (more light output is provided by more LEDs), or alternatively may be chosen by the desired output voltages at the taps, or the availability of the source voltage $V_{out}$, if lighting output is of secondary importance to those criteria. In this Example, five different voltages are made available for auxiliary loads: $V_{out}$, $V_1$, $V_2$, $V_3$, and $V_4$, but the driver circuit need only provide one voltage: $V_{out}$. Thus, the series LED array allows providing additional voltages without the addition of circuitry to the driver or without adding additional power supplies.

In contrast, in an even more general embodiment can utilize LEDs of different composition each of which may individually have different voltage drops across the LED, as discussed above regarding FIG. 3. In this case, the voltages of the taps are determined by the voltage drops across the individual LEDs. By choosing LEDs with the desired voltage drop, additional flexibility can be provided in the voltages that can be provided at the taps.

Figure 5:
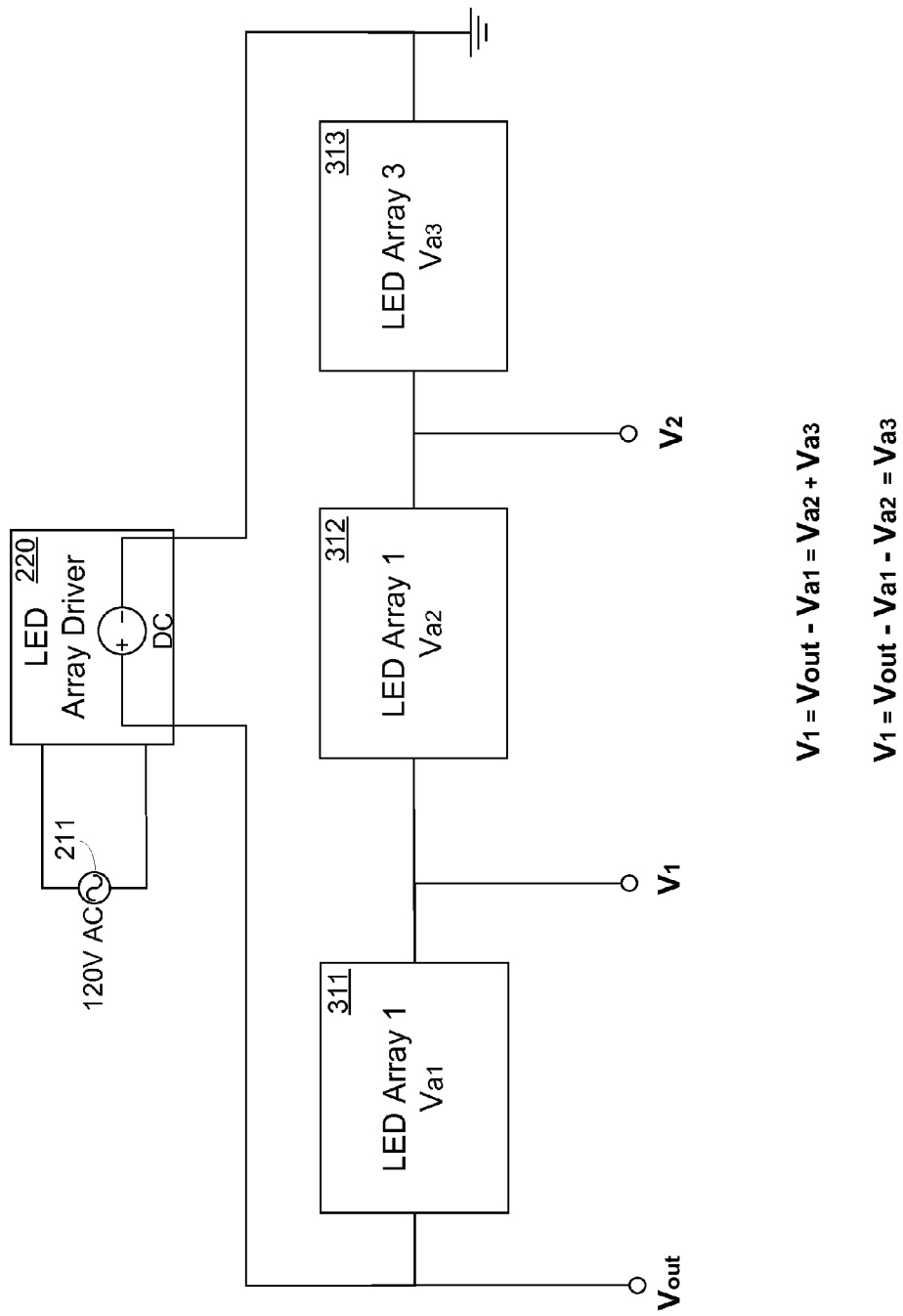
FIG. 5 shows a block diagram of tapping off another example LED array having arbitrary LED arrays.

FIG. 5 shows such an even more general example as a block diagram. An LED array driver 220 drives three banks of LED arrays 311, 312, and 313, any of which may be comprised of one or more LEDs of various types arranged in various manners including any desirable parallel and/or series arrangements of LEDs, and which have a respective arbitrary voltage drop of $V_{a1}$ $V_{a2}$ and $V_{a3}$. In this case, Equations 8 and 9 provide the respective output voltages of taps $V_1$ and $V_2$:

$$V_1 = V_{out} - V_{a1} = V_{a2} - V_{a3} \quad \text{Eq. 8}$$

$$V_2 = V_{out} - V_{a1} - V_{a2} = V_{a3} \quad \text{Eq. 9}$$

Figure 6:
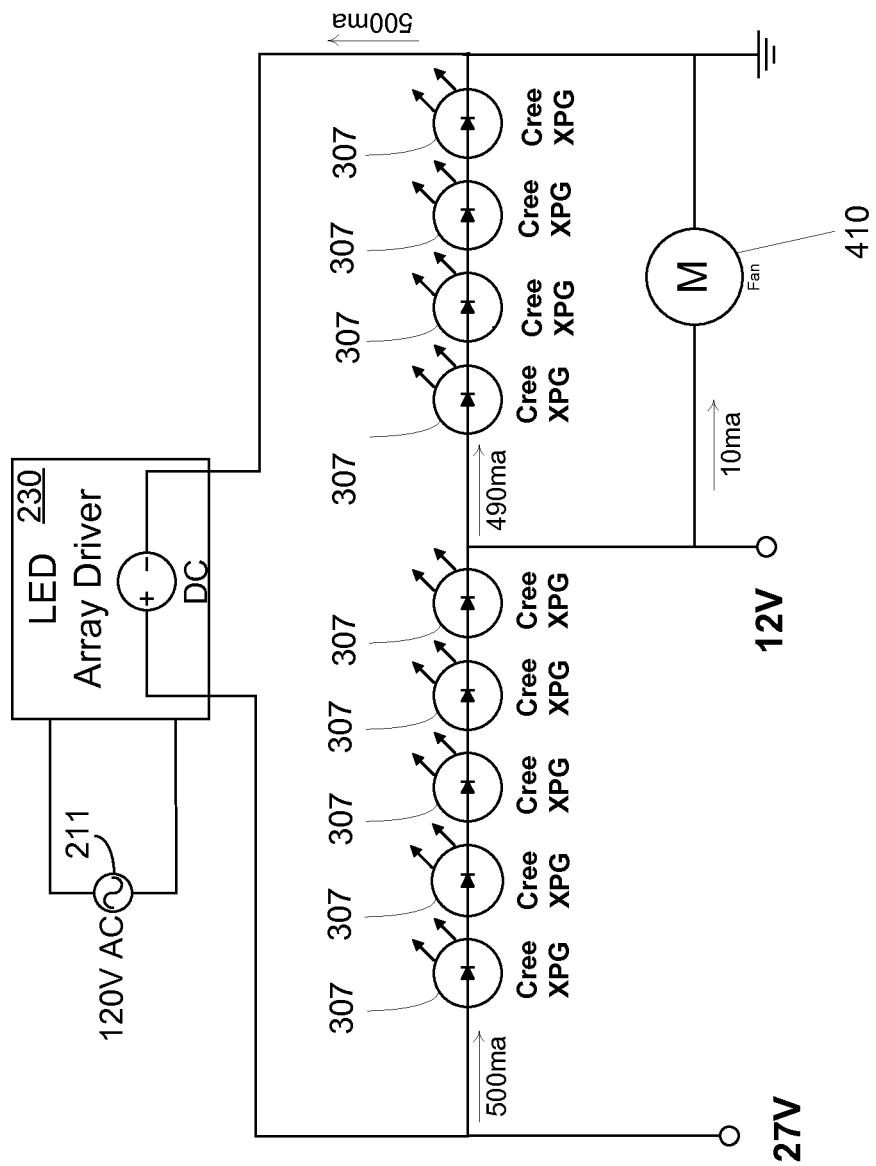
FIG. 6 shows a schematic diagram of tapping off another example LED array having uniform LEDs and a tap for driving an auxiliary load.

For example, as shown schematically in FIG. 6 in an example embodiment providing one tap, 9 white Cree XPG LEDs 307 operating at 500 ma in series would be driven by approximately 27V total across the entire string, provided by the LED array driver 230, because each LED drops approximately 3V. Thus, a 12V auxiliary supply to operate a fan, for example, could be provided by tapping off the voltage from the fourth LED from the bottom of the string. A flyback or buck converter 230 could be utilized in the LED array driver to provide the off-line conversion to continuous DC current for the entire LED series.

Thus, in this example, if the auxiliary supply needed about 10 ma of current, the bottom four LEDs would see 490 ma, while the auxiliary load was drawing the 10 ma. All other LEDs are still at 500 ma. Thus a method is provided to power a 12 V circuit from a 27V converter with zero additional components. The small decrease in the drive current of the bottom 3 LEDs is a tiny percentage of the total system power and won't adversely affect the LED array performance. Additional taps could have been provided at other locations to drive other loads, if desired. In this example, voltages of any multiple of 3V, from 3V to 27V could be provided utilizing appropriate taps.

Note that by arranging LEDs in a manner utilizing LEDs in parallel subsets (such as the example provided in FIG. 3A, among others), larger amounts of current may be provided to the auxiliary loads, such that LED subsets provided after the tap can utilize smaller numbers of LEDs to ensure that a sufficient current is provided to the LEDs subsequent to the tap to properly illuminate those LEDs, while a sufficient current is also provided to the higher current auxiliary load.

By utilizing LEDs of different types having different voltage drops, tap voltages can be further refined to be other than multiples of 3V. For example, if LEDs having voltage drops of 2V are also utilized, then voltages can be provided that are some combination of 2V and 3V could be provided, such as 2V, 3V, 4V, 5V, 6V, 7V, etc. as long as the sum of the voltages across all of the LEDs in series add up to the source voltage provided by the array driver.

By providing the proper tapping location, any multiple of the LED voltage drop ($V_f$) is available in a series string of LEDs for supplying to auxiliary loads. For example, the $V_f$ of a blue die LED (white is pumped by blue die) and green die LED is roughly 3V, whereas for red die LED $V_f$ is roughly 2 volts, which would determine the auxiliary voltage granularity in a multi color LED system.

Most LED lighting circuits utilize electronic drivers, and most such drivers have control Integrated Circuits (IC) that require a low voltage power supply for operation (they need a supply voltage $V_{CC}$ of 5 to 20 volts depending on brand), independent of the operating voltage and current of the LED array being driven. Thus, utilizing the array to tap out such a voltage for providing to the IC is another good application of the concept disclosed herein.

Figure 7:
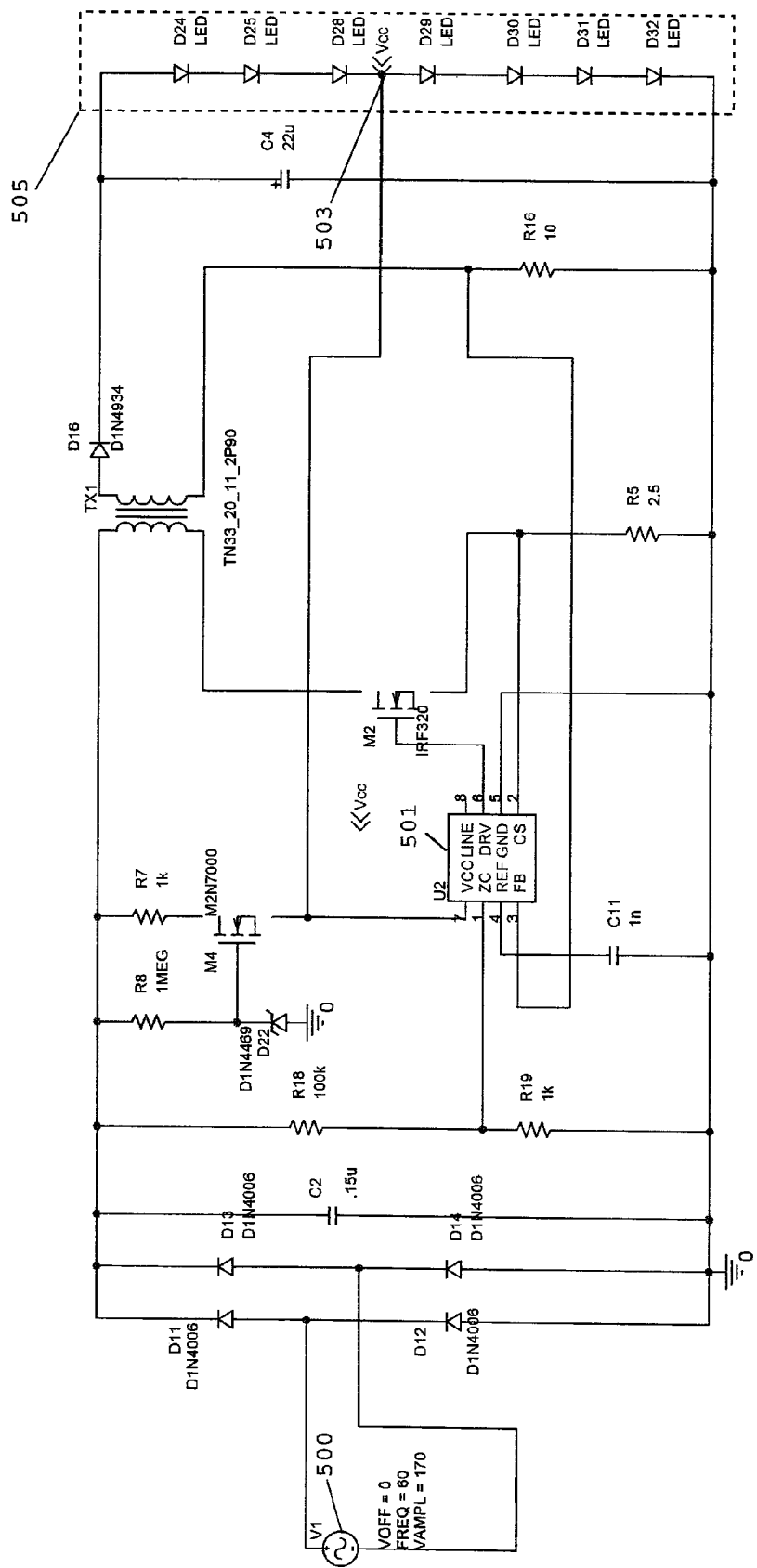
FIG. 7 shows a schematic diagram of an example LED array driver driving an LED array with a tap feeding back to the driver circuitry.

FIG. 7 shows an example modified flyback circuit for driving an LED array 505 from an AC power supply 500 with the circuit utilizing a tap 503 on an LED array (between LED D28 and LED D29) to provide the integrated circuit 501 with the necessary $V_{cc}$ to power the integrated circuit 501. In this case, the voltage provided to the IC will be 4/7 the voltage provided to drive the array (which is also 4 times the voltage drop across an individual diode) This allows a reduction of components by eliminating a number of diodes and capacitors that would otherwise be required to provide the desired voltages to drive the IC 501.

By tapping an LED lighting array to provide auxiliary power, various devices that utilize LED arrays for lighting purposes could be modified to drive auxiliary components while removing the need to provide special operating voltage power supplies for those components. For example, a fan may be required for higher power level LED lighting circuits in cases where heat generation requires additional cooling. By tapping the LED array as discussed herein, both the fan and the LED driver could be provided with their required operating voltages without requiring more complex power supplies.

An example application of this approach would be a 100 watt A-19 incandescent lamp replacement using an LED array. In this small space and with the many LEDs necessary to provide the large light output, a fan would likely be necessary to provide additional cooling.

Other examples where this technique could be applied include various low-current electronic devices that may utilize LED indicator lights along with other features that can be powered using taps off an LED array. Such devices as high-powered flashlights, or flashlights with electronic components (e.g., timers, battery indicators, etc.), or other illuminating devices might utilize this approach. Smart lighting utilizing controller components for various functions, including timing control, intensity control, dimming, or other functions could also be implemented using this technique.

Many other example embodiments of the invention can be provided through various combinations of the above described features. Although the invention has been described hereinabove using specific examples and embodiments, it will be understood by those skilled in the art that various alternatives may be used and equivalents may be substituted for elements and/or steps described herein, without necessarily deviating from the intended scope of the invention. Modifications may be necessary to adapt the invention to a particular situation or to particular needs without departing from the intended scope of the invention. It is intended that the invention not be limited to the particular implementations and embodiments described herein, but that the claims be given their broadest reasonable interpretation to cover all novel and non-obvious embodiments, literal or equivalent, disclosed or not, covered thereby.

What is claimed is:

1. An apparatus comprising:
   an LED array including a plurality of individual LEDs connected in a series for providing illumination;
   a driver connected to a source power supply for providing an operating voltage to said LED array;
   a first tap connected between two of said plurality of individual LEDs inside said LED array for providing a first auxiliary voltage less than said operating voltage;
   a second tap connected between another two of said plurality of individual LEDs inside said LED array for providing a second auxiliary voltage less than said operating voltage;
   a first auxiliary component connected to the first tap such that the first auxiliary voltage is used to power the first auxiliary component;
   a second auxiliary component connected to the second tap such that the second auxiliary voltage is used to power the second auxiliary component, and
   an additional tap connected between another two of said individual LEDs in said LED array for providing an additional auxiliary voltage, wherein said additional tap is connected to said driver for providing said additional auxiliary voltage as an operating voltage for said driver,
   wherein the first tap and the second tap are located between any two of said plurality of individual LEDs inside said LED array depending on the auxiliary voltages needed for the first auxiliary component and the second auxiliary component.

2. The apparatus of claim 1, wherein one of said first auxiliary component and second auxiliary component is a device for cooling said apparatus.

3. The apparatus of claim 1, wherein a voltage drop across at least one of said individual LEDs is different than a voltage drop across another of said individual LEDs.

4. The apparatus of claim 1, wherein said apparatus is adapted for replacing a lighting element of a light fixture.

5. The apparatus of claim 4, wherein one of said first auxiliary component and second auxiliary component is a device for cooling said apparatus.

6. The apparatus of claim 1, wherein said apparatus is adapted for replacing a lighting element of a light fixture and wherein an additional tap connected between two of said individual LEDs in said LED array is for providing an additional auxiliary voltage for providing an operating voltage for said driver.

7. The apparatus of claim 6, wherein one of said first auxiliary component and second auxiliary component is a device for cooling said apparatus.

8. An apparatus comprising:
an LED array including a plurality of individual LEDs connected in a series for providing illumination;
a driver connected to a source power supply for providing an operating voltage to said LED array; and
a first tap connected between two of said plurality of individual LEDs inside said LED array for providing a first auxiliary voltage less than said operating voltage,
a second tap connected between another two of said plurality of individual LEDs inside said LED array for providing a second auxiliary voltage less than said operating voltage; and
an auxiliary component connected to the second tap; wherein
said first tap is connected to said driver for providing said first auxiliary voltage as an operating voltage for said driver,
said second auxiliary voltage is used to power the auxiliary component; and
wherein the first tap and the second tap are located between any two of said plurality of individual LEDs inside said LED array depending on the auxiliary voltages needed for the driver and the auxiliary component.

9. The apparatus of claim 8, wherein said driver includes an integrated circuit, and wherein said first auxiliary voltage is provided to provide an operating voltage to said integrated circuit.

10. The apparatus of claim 8, wherein said auxiliary component is a device for cooling said apparatus.

11. The apparatus of claim 8, wherein said apparatus is adapted for replacing a lighting element of a light fixture.

12. An apparatus comprising:
an LED array including a plurality of individual LEDs connected in a series for providing illumination;
a driver connected to a source power supply for providing an operating voltage to said LED array; and
a first tap connected between two of said plurality of individual LEDs inside said LED array for providing a first auxiliary voltage as an operating voltage to said driver;
a second tap connected between another two of said plurality of individual LEDs inside said LED array for providing a second auxiliary voltage; and
an auxiliary component connected to said second tap such that said secondary auxiliary voltage is used to power said auxiliary component,
wherein the second tap is located between any two of said plurality of individual LEDs inside said LED array depending on the auxiliary voltage needed for the auxiliary component.

13. The apparatus of claim 12, wherein said apparatus is adapted for replacing a lighting element of a light fixture, and wherein said auxiliary component is a device for cooling said apparatus.

14. A method for providing a voltage to components by tapping an LED array, the method comprising the steps of:
Illuminating an area using an LED array comprising a plurality of individual LEDs connected in series;
supplying operating voltage to said LED array by connecting a driver to a voltage output from a voltage source; and
tapping a first auxiliary voltage from between two of said plurality of individual LEDs inside said LED array for providing said first auxiliary voltage as an operating voltage for said driver, wherein said first auxiliary voltage is less than the voltage output from said voltage source,
tapping a second auxiliary voltage from between another two of said plurality of individual LEDs inside said LED array for powering an auxiliary component, wherein said second auxiliary voltage is less than the voltage output from said voltage source,
wherein the first auxiliary voltage and the second auxiliary voltage are tapped between any two of said plurality of individual LEDs inside said LED array depending on the auxiliary voltages needed for the first load and the second load.

15. The method of claim 14, wherein said load is a device for cooling said array.

16. The method of claim 14, further comprising the step of tapping another auxiliary voltage from between another two of said individual LEDs of said LED array for powering another load.

* * * * *